United States Patent Office 3,274,153
Patented Sept. 20, 1966

3,274,153
METHOD OF POLYMERIZING HYDROXYLATED ORGANOSILICON COMPOUNDS
James Franklin Hyde and Elmer M. Schultz, Midland, Mich., assignors to Dow Corning Corporation, Midland, Mich., a corporation of Michigan
No Drawing. Filed May 2, 1962, Ser. No. 191,738
12 Claims. (Cl. 260—46.5)

This invention relates to a method of polymerizing organosiloxanes having silicon-bonded hydroxyl groups.

There are two basic commercial methods for polymerizing organosiloxanes. One of these is by rearranging siloxane linkages. This method involves the use of a bond rearranging catalyst such as strong alkalies or strong acids. By this method one can polymerize cyclic siloxanes to high molecular weight gums. This method is widely used commercially but it suffers from the disadvantage that the siloxane bonds of the high polymer will rearrange to regenerate the cyclic starting materials. Consequently, this method inherently gives a certain portion of cyclic products in the final polymer.

Another method of polymerizing siloxanes is through the condensation of silicon-bonded hydroxyl groups. By this method no cyclic products are formed from the polymerized material. One example of such a catalyst is contained in U.S. Patent 2,902,468. It is this method of polymerization to which this invention is directed.

It is an object of this invention to provide a new method for polymerizing siloxanes containing silicon-bonded hydroxyl groups which will give high molecular weight polymers. Another object is to provide a method for polymerizing siloxanes without the accompanying rearrangement of the siloxane bond to give low molecular weight polymers. Another object is to provide a novel method of curing siloxanes. A further object is to provide a method of condensing silicon-bonded hydroxyl groups with a catalyst that is soluble in the siloxane system. These and other objects will be apparent from the following description.

This invention relates to a method of polymerizing organosilicon compounds containing silicon-bonded hydroxyl radicals which comprises contacting (1) an organosilicon compound having an average per silicon atom of 1.98 to 2.01 inclusive substituent groups selected from the group consisting of monovalent hydrocarbon radicals, perfluoroalkylethyl radicals, haloaryl radicals and cyanoalkyl radicals, and an average per molecule of two SiOH groups, any remaining valences of said organosilicon compound being satisfied with substituents selected from the group consisting of divalent oxygen atoms, divalent hydrocarbon radicals and divalent haloaryl radicals, and (2) a compound of the structure

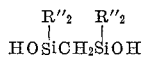

wherein

R is selected from the group consisting of monovalent hydrocarbon radicals, monovalent halohydrocarbon radicals, halogen atoms and monovalent hydrocarbonoxy radicals, each R group containing up to about 10 carbon atoms, M is selected from the group consisting of sodium, potassium, tetraorgano nitrogen radicals and tetraorganophosphorus radicals, the organic radicals of the said organo-nitrogen and organophosphorus radicals being selected from the group consisting of monovalent alkyl and aryl radicals attached directly to the said nitrogen and phosphorus atoms, $m$ is an integer from 0 to 3 inclusive, and
$n$ is an integer from 1 to 3 inclusive, $m+n$ in an integer from 1 to 4 inclusive until the desired degree of polymerization is obtained.

The process of this invention is equally useful for the preparation of polymers and copolymers of organosilicon compounds. For example, the procedure can be used to prepare a homopolymer of dimethylpolysiloxane in which case the starting material would be a hydroxylated dimethylsiloxane or diol. The method can also be used to prepare copolymers of siloxanes. For example, a mixture of hydroxylated dimethylsiloxane and hydroxylated phenylmethylsiloxane can be contacted with one of the catalysts (2) to obtain the desired copolymer. In addition, copolymers containing both siloxane and silcarbane linkages can be made by this method from the appropriate hydroxylated organosilicon compounds.

The method of this invention is applicable to any organosilicon compound containing two silicon-bonded hydroxyl radicals. The hydroxylated organosilicon compound can be made up of units of the formulae $R''SiO_{3/2}$, $R''_2SiO$, $R''_3SiO_{1/2}$, various silcarbane structures such as silmethylene, silethylene, silphenylene, etc., wherein various R'' groups are also present, as well as limited amounts of $SiO_2$ units. It should be understood that the starting material can be a monomeric diol such as $R''_2Si(OH)_2$ or

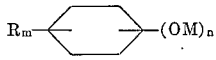

The temperature at which the polymerization occurs is not critical. The polymerization can proceed at room temperature particularly when the catalyst selected is quite soluble in the hydroxylated organosilicon compound. The polymerization can also be carried out at elevated temperatures. In general, the higher the temperature the faster the polymerization. However, prolonged heating at excessive temperatures such as 250° C. should be avoided since it tends to decompose the catalyst.

It has also been found that it is advantageous to remove water from the reaction mixture since the appearance of water seems to slow down the polymerization. However, the polymerization will proceed in the presence of water, but at a slower rate.

The reaction can be carried out, if desired, in the presence of an organic liquid. The liquid should be a solvent for the organosilicon component, and may or may not be a solvent for the catalyst. When the said solvent is a solvent for the catalyst as well, the reaction rate is often increased. Any organic liquid that does not react with the components of the invention can be used as a solvent. This includes, for example, hydrocarbons, halohydrocarbons, halocarbons, ethers, esters, ketones, polyethers, nitriles, sulfones, etc. Such organic solvents as acids and amines should be avoided because of undesirable reaction with the catalyst. Such organic solvents as alcohols should be avoided because of reaction with the silicon-bonded hydroxyl groups. It is preferred, but not necessary, when employing a solvent to select one that is immiscible with water. By this selection, the polymerization can be carried out with removal of water of condensation by the technique known as "azeotroping." A mutual solvent is often useful when component (1) is a mixture of immiscible organosilicon compounds, such as a mixture of a hydroxylated dimethylpolysiloxane fluid and a diol of the structure

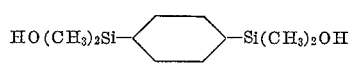

The relative proportions of organosilicon compound (1) and the catalyst (2) are not critical. However, the proportion of catalyst will affect the rate of reaction up to a point. A desirable range for carrying out the reaction is from 0.01 percent to about 5 percent by weight of catalyst. It should be understood, however, that higher or lower amounts of catalyst are operative.

The process of this invention is applicable to any organosilicon compound having an average of two of the defined substituent groups per silicon atom. Thus, for the purpose of this invention, the organisilicon compound (1) can be a monomeric material such as diphenylsilane diol or dimethylsilane diol. Organosilicon compound (1) can also be polymeric materials, such as 1,1,3,3-tetramethyl - 1,3 - disilapropane - 1,3 - diol, 1,3 - dimethyl - 1,3 - diphenyl - 1,3 - disiloxane - 1,3 - diol, hydroxylated diethylsiloxanes, and hydroxylated phenylmethylsiloxanes. In addition, organosilicon compound (1) can be copolymers of any of the defined organosilicon compounds such as copolymers of chlorophenylmethylsiloxane and dimethylsiloxane, and copolymers of monophenylsiloxane, phenylmethylsiloxane and trimethylsiloxane. As well, organosilicon compound (1) can be a mixture of two or more of the defined monomers, polymers and copolymers.

For the purpose of this invention the monovalent hydrocarbon radicals attached to the silicon atoms of (1) can be any monovalent hydrocarbon radical such as alkyl radicals such as methyl, ethyl, isopropyl, tertiarybutyl, octadecyl or myricyl; alkenyl radicals such as vinyl, allyl, methallyl, hexenyl or butadienyl; cycloaliphatic radicals such as cyclopentyl, cyclobutyl and cyclohexenyl; aralkyl radicals such as benzyl and beta-phenylethyl; and aromatic hydrocarbon radicals such as phenyl, xenyl, tolyl, naphthyl and anthracyl. The organosilicon compound (1) can also contain any perfluoroalkylethyl radical such as 3,3,3-trifluoropropyl and $C_9F_{19}CH_2CH_2—$; haloaryl radicals such as tetrachlorophenyl, pentabromoxenyl, and iodonaphthyl; and cyanoalkyl radicals such as $—CH_2CH_2CN$,

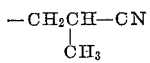

and the like.

The divalent hydrocarbon radicals of organosilicon compound (1) can be any divalent hydrocarbon radical such as alkylene such as methylene, ethylene, hexylene and octadecylene; alkenylene radicals such as propenylene, butenylene and hexenylene; aryl radicals such as phenylene, xenylene, tolylene and naphthylene; and any divalent haloarylene radicals such as tetrachlorophenylene, dibromonaphthylene, iodotolylene and bis-(trifluoromethyl)-xenylene.

In catalyst (2) R can be any halogen atom (fluorine, chlorine, bromine, iodine) and can be any monovalent hydrocarbon radical containing up to 10 carbon atoms such as alkyl radicals such as methyl, ethyl, isobutyl, tertiary amyl and decyl; unsaturated aliphatic radicals such as vinyl, allyl, propynyl and butadienyl; cycloaliphatic radicals such as cyclohexyl, cyclobutyl and cyclopentenyl; aralkyl radicals such as benzyl and beta-phenylethyl; and aromatic radicals such as phenyl, tolyl and xylyl; radical R can also be any halogenated monovalent hydrocarbon radical such as chloromethyl, bromovinyl, trifluoroethyl, tetrachlorophenyl and iodotolyl; radical R can also be any monovalent hydrocarbonoxy radical such as methoxy, isobutoxy, allyloxy and phenoxy.

Catalyst (2) can contain 0, 1, 2 or 3 of the said R groups. When two or more R groups are present on the aromatic ring they can be the same or different. An advantage to be derived from the presence of substituent groups in certain cases is to promote greater solubility of the catalyst in the organosilicon composition to be polymerized. For example, the potassium salt of tertiarybutylphenol is quite soluble in hydroxylated dimethylpolysiloxane fluids. This increased solubility renders the said catalyst more efficient than, for example, the somewhat less soluble potassium salt of phenol. For other systems other R groups, or perhaps none at all, would promote greater solubility, when desired.

As stated above, substituent M of catalyst (2) can be sodium or potassium. Substituent M can also be a tetra-organonitrogen or tetra-organophosphorus compound, the said organic radicals thereof being any monovalent alkyl or aryl radical, such as methyl, ethyl, isobutyl, phenyl, benzyl and naphthyl. The relative activity of the catalyst is determined in great part with respect to rate on the M group selected. Generally, this rate effect is similar to that observed with the strong rearranging catalyst of the formula MOH where M is as defined above, except that the differences in rate among the different catalysts of this invention are not nearly so pronounced as in the hydroxides.

Either one, two or three —OM groups can be present in the catalyst molecule. When more than three such radicals are present the desirable solubility characteristics are lost. It is preferred, but not necessary, that only one said —OM group be present.

The novel catalyst of this invention are best prepared by reacting stoichiometric amounts of the following compounds:

(A)
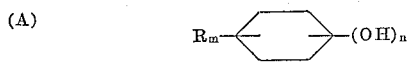

(B)         MOH wherein R, M, $m$ and $n$ are as defined for the invention. The two compounds are best mixed in a mutual solvent such as water or a water-alcohol mixture. Any solvent will do provided only that it dissolves the reactants without reacting therewith. The compounds A and B react immediately, often with the evolution of heat. Where the solvent is one that will not interfere with the system to be polymerized, the catalyst can be added as a solution. However, for convenience in storage, handling and metering, it is preferred that the solvent be removed and the product recovered dry. It has been found that these compounds are quite stable to moisture, easy to dehydrate and easily storable in the anhydrous state. This is in marked contrast to the silanolates and alcoholates, which are extremely hygroscopic and hydrolyze quickly and completely in the presence of moisture, and to the corresponding hydroxides which readily hydrate.

Specific examples of catalysts operable in this invention include potassium phenoxide, sodium-p-methylphenoxide,

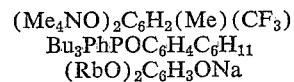

etc.

The process of this invention is especially suitable for the preparation of high polymers suitable for the manufacture of silicone rubber. It is also suitable for the curing of resinous silicones that may be applied as coatings for electrical conductors or as protective coatings for wood and metal surfaces. The process can also be used to prepare siloxane fluids of any desired higher viscosity than the starting reactants by suitably selected conditions of time and temperature which restricts the degree of polymerization.

The following examples are illustrative only and should not be construed as limiting the invention which is properly delineated in the appended claims. In the examples to follow the symbols Me, Et and Vi represent the methyl, ethyl and vinyl radicals respectively, and parts are by weight.

*Example 1*

To 100 parts of a hydroxyl endblocked dimethylpolysiloxane fluid having a viscosity of 10,000 cs. at 25° C. were added 0.054 part of $NaOC_6H_5$ (sodium phenoxide). The catalyst was dispersed well by stirring, and the mixture heated 4.5 hours at 150° C. and atmospheric pressure, after which it was cooled to room temperature. The viscosity had risen to 650,000 cs. at 25° C.

Example 2

To 100 parts of a hydroxyl endblocked dimethylpolysiloxane fluid having a viscosity of 51.8 cs. at 25° C. were added 0.05 part of the catalyst of Example 1. The well mixed charge was heated 2.5 hours at 150° C. at a pressure less than 1.0 mm. of mercury. The cooled material had a viscosity of 38,500,000 cs. at 25° C.

Example 3

A mixture of 100 parts of a hydroxyl endblocked dimethylpolysiloxane having a viscosity of 45.9 cs. at 25° C. and 0.01 part of potassium phenoxide was heated 1.25 hours at 110° C. and about 1.0 mm. of mercury, whereupon the cooled polymer produced had a viscosity at 25° C. of 120,000,000 cs.

Example 4

A mixture was made of 100 parts of a hydroxyl endblocked copolymer fluid containing 92.354 mol percent dimethylsiloxane units, 7.50 mol percent phenylmethylsiloxane units and 0.146 mol percent of methylvinylsiloxane units, having a viscosity at 25° C. of 15,000 cs., and 0.02 part of potassium phenoxide. The mixture was heated 3 hours at 65° C. and 2 mm. of mercury, whereupon there was produced a copolymer having a viscosity at 25° C. of 4,500,000 cs.

Example 5

A mixture of 100 parts of a hydroxyl endblocked 3,3,3-trifluoropropylmethylsiloxane fluid having a viscosity of 450 cs. at 25° C. and 0.1 part of sodium phenoxide was heated 2.5 hours at 80–110° C. and 1.0 mm. of mercury. The product was a dry high polymer having a viscosity greater than 120,000,000 cs. at 25° C.

Example 6

A mixture of 100 parts of a hydroxyl endblocked dimethylpolysiloxane fluid having a viscosity of 10,000 cs. at 25° C. and 0.05 part of $NaOC_6H_4C_6H_{11}$ was heated 8 hours at 100 to 120° C. and 1 mm. of mercury, producing a polymer having a viscosity of 8,960,000 cs. at 25° C.

The catalyst $(NaO)_3C_6H_3$ was used in place of the one above in otherwise identical conditions, producing a polymer having a viscosity of 781,000 cs. at 25° C.

Example 7

A mixture of 100 parts of a hydroxyl endblocked dimethylpolysiloxane having a viscosity of 45.9 cs. at 25° C. and 0.04 part of $KOC_6H_4C(CH_3)_3$ was heated 1.25 hours at 100 to 130° C. and 1.0 mm. of mercury, whereupon there was produced a polymer having a viscosity of 45,000,000 cs. at 25° C.

Example 8

The catalyst $NaOC_6H_3[C(CH_3)_3]_2$ was substituted in equal amount for the catalyst of Example 7. The mixture was heated 3 hours at 100° C. and 1.0 mm. of mercury. The product had a viscosity of 5,000,000 cs. at 25° C.

Example 9

A solution of 13.6 parts of a hydroxyl endblocked dimethylpolysiloxane having a viscosity of 45.7 cs. at 25° C., 50 parts of toluene, and 0.08 part of sodium phenoxide was heated to 80° C. and 36.4 grams of diphenylsilanediol added slowly with stirring. When polymerization had proceeded to the point that all the diphenylsilanediol had dissolved, the solution was heated to 100° C. and the toluene removed by vacuum, after which the pressure was reduced to about 1 mm. of mercury. Total heating time at 100° C. including time to remove the solvent was 3 hours. The product was a clear copolymer having a viscosity of 100,000,000 cs. at 25° C.

Example 10

A solution of 78.12 parts of a hydroxyl end-blocked dimethylpolysiloxane having a viscosity of 45.9 cs. at 25° C. and 10.94 parts of hydroxyl endblocked 3,3,3-trifluoropropylmethylpolysiloxane fluid having a viscosity of 450 cs. at 25° C. in 100 parts of toluene and containing 0.78 part of sodium phenoxide was heated to about 80° C. and 1094 parts of diphenylsilane diol added slowly with stirring. When all the diphenylsilanediol had dissolved the solution was heated to 100° C. and the toluene pumped off. A vacuum to 1 mm. of mercury was applied and the system maintained for 16 hours total time. The cooled product was a high polymer of suitable viscosity for silicone rubber use.

Example 11

A solution of ten parts of a hydroxyl endblocked dimethylpolysiloxane having a viscosity of 58.3 cs. at 25° C. 90 parts of toluene and 0.005 part of $NaOC_6H_4C_8H_{17}$ were heated to reflux in an azeotropic water removal apparatus. Total heating time at reflux was 10 hours, but samples were withdrawn at the intervals shown below, the toluene removed and the viscosity measured. Results were as follows:

| Reflux time, hrs.: | Viscosity, cs. at 25° C. |
|---|---|
| 2.5 | 1,600 |
| 5.5 | 3,680 |
| 10 | 93,000 |

Example 12

A solution of 100 parts of a hydroxyl endblocked dimethylpolysiloxane fluid having a viscosity of 44.2 cs. at 25° C., 100 parts of toluene and 0.063 part of $Me_4NOC_6H_5$ were heated 0.6 hour at the reflux, with azeotropic water removal. The cooled stripped product had a viscosity of 100,000 cs. at 25° C.

Example 13

A solution of 307.5 parts of a hydroxyl endblocked dimethylpolysiloxane having a viscosity of 45.9 cs. at 25° C., 52.5 parts of diphenylsilanediol, 0.3 part of a hydroxyl endblocked methylvinylpolysiloxane having a viscosity of 40 cs. at 25° C., 640 parts of toluene and 0.36 part of $KOC_6H_3[C(CH_3)_3]_2$ was heated one hour at reflux temperature, with azeotropic water removal. The cooled stripped product was a clear high polymer suitable for use in silicone rubber.

Example 14

Equivalent results are obtained when any of the following catalysts, in the amount shown, are substituted for the catalyst of Example 1:

0.01 part of $(C_4H_9)_4POC_6H_2Me_3$ 0.05 part of

0.65 part of $(NaO)_3C_6H_2Br$ 1.25 parts of

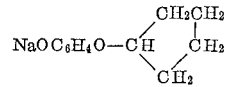

0.25 part of $C_6H_5C_6H_4OK$

Example 15

When 0.2 part of

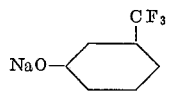

are substituted for the catalyst of Example 5, a high polymer suitable for silicone rubber is formed.

Example 16

When 100 parts of a hydroxyl endblocked phenylmethylsiloxane fluid having a viscosity of 450 cs. at 25° C. and 1.0 part of cesium phenolate are mixed at high speed at room temperature, and water formed by the reaction removed by a fast stream of dry air blown over the surface of the reacting mass, the viscosity will increase showing that polymerization is proceeding.

Example 17

High polymers suitable for use in silicone rubber are formed when any of the siloxanes listed below are substituted for the polysiloxanes of Example 9.

(a) A hydroxyl endblocked cyanopropylmethylpolysiloxane fluid having a viscosity of 9,300 cs. at 25° C.

(b) A hydroxyl endblocked copolymer containing 10 mol percent chlorophenylmethylsiloxane units, 40 mol percent beta-phenylethylmethylsiloxane units, and 50 mol percent ethylmethylsiloxane units.

(c) A mixture containing 50 weight percent of

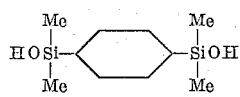

and 50 weight percent of a hydroxyl endblocked dimethylpolysiloxane having a viscosity of 50 cs. at 25° C.

(d) A mixture containing 10 weight percent of

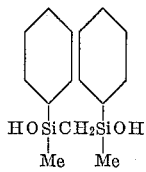

20 weight percent

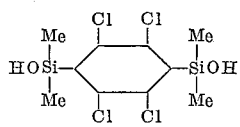

5 weight percent of a hydroxyl endblocked cyclopentenylmethylpolysiloxane having a viscosity of 300 cs. at 25° C., and 65 weight percent of a hydroxyl endblocked phenylmethylpolysiloxane having a viscosity of 750 cs. at 25° C.

(e) A hydroxyl endblocked fluid containing units of the structure

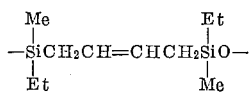

Example 18

Equivalent results are obtained when any of the solvents listed below are substituted for toluene in Example 12; heptane, bromobenzene, perchloroethylene, methylisobutyl ketone, di-n-butyl ether, propionitrile, the dimethyl ether of ethylene glycol, and dimethylsulfone.

That which is claimed is:

1. A method of polymerizing organosilicon compounds containing silicon-bonded hydroxyl radicals which method comprises contacting (1) an organosilicon compound having an average per silicon atom of 1.98 to 2.01 inclusive substituent groups selected from the group consisting of monovalent hydrocarbon radicals, perfluoroalkylethyl radicals, haloaryl radicals and cyanoalkyl radicals, and an average per molecule of two SiOH groups, any remaining valences of said organosilicon compound being satisfied with substituents selected from the group consisting of divalent oxygen atoms, divalent hydrocarbon radicals and divalent haloarylene radicals, with (2) a compound of the structure

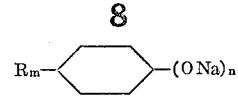

wherein

R is selected from the group consisting of monovalent hydrocarbon radicals, monovalent halohydrocarbon radicals, halogen atoms, and monovalent hydrocarbonoxy radicals, each R group containing up to about 10 carbon atoms, $m$ is an integer from 0 to 3 inclusive, and $n$ is an integer from 1 to 3 inclusive, $m+n$ is an integer from 1 to 4 inclusive until the desired degree of polymerization is obtained.

2. The method of claim 1 wherein there is produced a high polymer suitable for use in silicone rubber.

3. A method of polymerizing organosilicon compounds containing silicon-bonded hydroxyl radicals which method comprises contacting (1) an organosilicon compound having an average per silicon atom of 1.98 to 2.01 inclusive substituent groups selected from the group consisting of monovalent hydrocarbon radicals, perfluoroalkylethyl radicals, haloaryl radicals, and cyanoalkyl radicals, and an averge per molecule of two SiOH groups, any remaining valences of said organosilicon compound being satisfied with substituents selected from the group consisting of divalent oxygen atoms, divalent hydrocarbon radicals and divalent haloarylene radicals, with (2) sodium phenoxide until the desired degree of polymerization is obtained.

4. A method of polymerizing organosilicon compounds containing silicon-bonded hydroxyl radicals which method comprises contacting (1) an organosilicon compound having an average per silicon atom of 1.98 to 2.01 inclusive substituent groups selected from the group consisting of monvalent hydrocarbon radicals, perfluoroalkylethyl radicals, haloaryl radicals, and cyanoalkyl radicals, and an average per molecule of two SiOH groups, any remaining valences of said organosilicon compound being satisfied with substituents selected from the group consisting of divalent oxygen atoms, divalent hydrocarbon radicals and divalent haloarylene radicals, with (2) a compound of the structure $$R_m-\underset{}{\underset{}{\bigcirc}}-(OK)_n$$

wherein

R is selected from the group consisting of monovalent hydrocarbon radicals, monovalent halohydrocarbon radicals, halogen atoms, and monovalent hydrocarbonoxy radicals, each R group containing up to about 10 carbon atoms, $m$ is an integer from 0 to 3 inclusive, and $n$ is an integer from 1 to 3 inclusive, $m+n$ is an integer from 1 to 4 inclusive until the desired degree of polymerization is obtained.

5. The method of claim 4 wherein there is produced a high polymer suitable for use in silicone rubber.

6. A method of polymerizing organosilicon compounds containing silicon-bonded hydroxyl radicals which method comprises contacting (1) an organosilicon compound having an average per silicon atom of 1.98 to 2.01 inclusive substituent groups selected from the group consisting of monovalent hydrocarbon radicals, perfluoroalkylethyl radicals, haloaryl radicals and cyanoalkyl radicals, and an average per molecule of two SiOH groups, any remaining valences of said organosilicon compound being satisfied with substituents selected from the group consisting of divalent oxygen atoms, divalent hydrocarbon radicals and divalent haloarylene radicals, with (2) potassium phenoxide, until the desired degree of polymerization is obtained.

7. A method of polymerizing organosilicon compounds containing silicon-bonded hydroxyl radicals which method comprises contacting (1) an organosilicon compound having an average per silicon atom of 1.98 to 2.01 inclusive substituent groups selected from the group consisting of monvalent hydrocarbon radicals, perfluoroalkylethyl radicals, haloaryl radicals and cyanoalkyl radicals, and an average per molecule of two SiOH groups, any remaining valences of said organosilicon compound being satisfied with substituents selected from the group consisting of divalent oxygen atoms, divalent hydrocarbon radicals and divalent haloarylene radicals, with (2) a compound of the structure

wherein

R is selected from the group consisting of monovalent hydrocarbon radicals, monovalent halohydrocarbon radicals, halogen atoms, and monovalent hydrocarbonoxy radicals, each R group containing up to about 10 carbon atoms, M is a tetraorganonitrogen radical, the organic radicals of said nitrogen radical being selected from the group consisting of monovalent alkyl and aryl radicals attached directly to the said nitrogen atom, $m$ is an integer from 0 to 3 inclusive, $n$ is an integer from 1 to 3 inclusive, and $m+n$ is an integer from 1 to 4 inclusive until the desired degree of polymerization is obtained.

8. The method of claim 7 wherein there is produced a high polymer suitable for use in silicone rubber.

9. The process of claim 7 which is carried out in an inert organic solvent.

10. A method of polymerizing organosilicon compounds containing silicon-bonded hydroxyl radicals which method comprises contacting (1) an organosilicon compound having an average per silicon atom of 1.98 to 2.01 inclusive substituent groups selected from the group consisting of monvalent hydrocarbon radicals, perfluoroalkylethyl radicals, haloaryl radicals and cyanoalkyl radicals, and an average per molecule of two SiOH groups, any remaining valences of said organosilicon compound being satisfied with substituents selected from the group consisting of divalent oxygen atoms, divalent hydrocarbon radicals and divalent haloarylene radicals, with (2) a compound of the structure

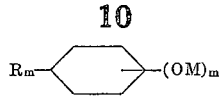

wherein

R is selected from the group consisting of monovalent hydrocarbon radicals, monovalent halohydrocarbon radicals, halogen atoms, and monovalent hydrocarbonoxy radicals, each R group containing up to about 10 carbon atoms, M is a tetraorganophosphorus radical, the organic radicals of said phosphorus radical being selected from the group consisting of monovalent alkyl and aryl radicals attached directly to the said phosphorus atom, $m$ is an integer from 0 to 3 inclusive, $n$ is an integer from 1 to 3 inclusive, and $m+n$ is an integer from 1 to 4 inclusive until the desired degree of polymerization is obtained.

11. The method of claim 10 wherein there is produced a high polymer suitable for use in silicone rubber.

12. The process of claim 10 which is carried out in an inert organic solvent.

References Cited by the Examiner

UNITED STATES PATENTS

| | | | |
|---|---|---|---|
| 2,460,799 | 2/1949 | Barry | 260—46.5 |
| 2,695,307 | 11/1954 | Guillissen et al. | 260—46.5 |
| 2,843,560 | 7/1958 | Mika | 260—47 |
| 2,902,468 | 9/1959 | Fianu | 260—46.5 |

FOREIGN PATENTS

| | | |
|---|---|---|
| 122,736 | 11/1946 | Australia. |
| 831,724 | 2/1952 | Germany. |

OTHER REFERENCES

Isacescu, 57, Chem. Abstracts 3615f (1962).

Noll, Chemie and Technologie der Silicone, Verlag Chemie, G.m.b.H, 1960, pages 144–148.

LEON J. BERCOVITZ, *Primary Examiner.*

MURRAY TILLMAN, *Examiner.*

M. I. MARQUIS, *Assistant Examiner.*

UNITED STATES PATENT OFFICE
CERTIFICATE OF CORRECTION

Patent No. 3,274,153 September 20, 1966

James Franklin Hyde et al.

It is hereby certified that error appears in the above numbered patent requiring correction and that the said Letters Patent should read as corrected below.

Column 6, line 8, for "1094" read -- 10.94 --; column 8, line 56, for "degre" read -- degree --.

Signed and sealed this 26th day of September 1967.

(SEAL)
Attest:

ERNEST W. SWIDER
Attesting Officer

EDWARD J. BRENNER
Commissioner of Patents